United States Patent
Herron

[15] 3,668,936
[45] June 13, 1972

[54] METHOD AND APPARATUS FOR SAMPLING

[72] Inventor: Rand E. Herron, Stamford, Conn.
[73] Assignee: Technicon Instruments Corporation, Tarrytown, N.Y.
[22] Filed: Dec. 15, 1970
[21] Appl. No.: 98,365

[52] U.S. Cl. .................................................... 73/423 A
[51] Int. Cl. ............................................................ G01h 1/14
[58] Field of Search ............ 73/423 A, 421 B; 356/244, 246; 23/253

[56] References Cited

UNITED STATES PATENTS 2,899,280   8/1959   Whitehead et al. ...................... 23/230
3,186,235   6/1965   Ferrari ........................................ 73/432

Primary Examiner—S. Clement Swisher
Attorney—Tedesco & Rockwell

[57] ABSTRACT

There is provided a method and apparatus for sampling a viscous liquid by aspiration of such liquid from a container in an off-take tube of a probe insertable in the container. A reagent having the characteristic of a solvent is added to the sample to dilute it within the probe after a relatively short distance of travel of the sample within the probe. The reagent is fed into the probe at a first predetermined flow rate and the admixture is aspirated at a second predetermined flow rate which is faster so that the sample is aspirated at a rate determined by the difference between the first and second flow rates.

3 Claims, 3 Drawing Figures

PATENTED JUN 13 1972
3,668,936
FIG. 1
FIG. 2
FIG. 3
INVENTOR
RAND E. HERRON
BY
Stephen E. Rockwell
ATTORNEY
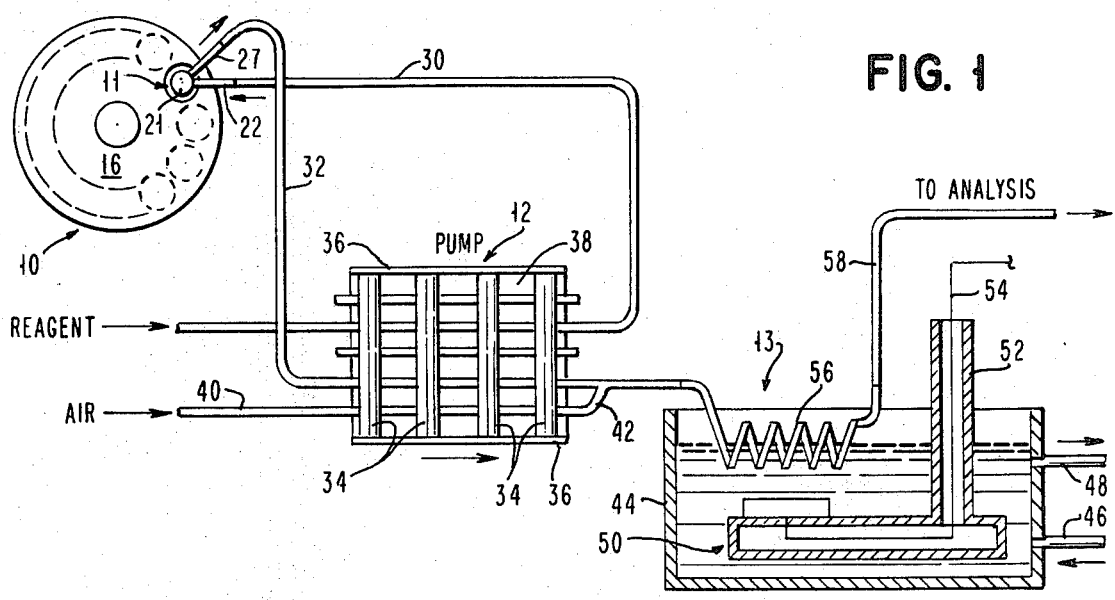
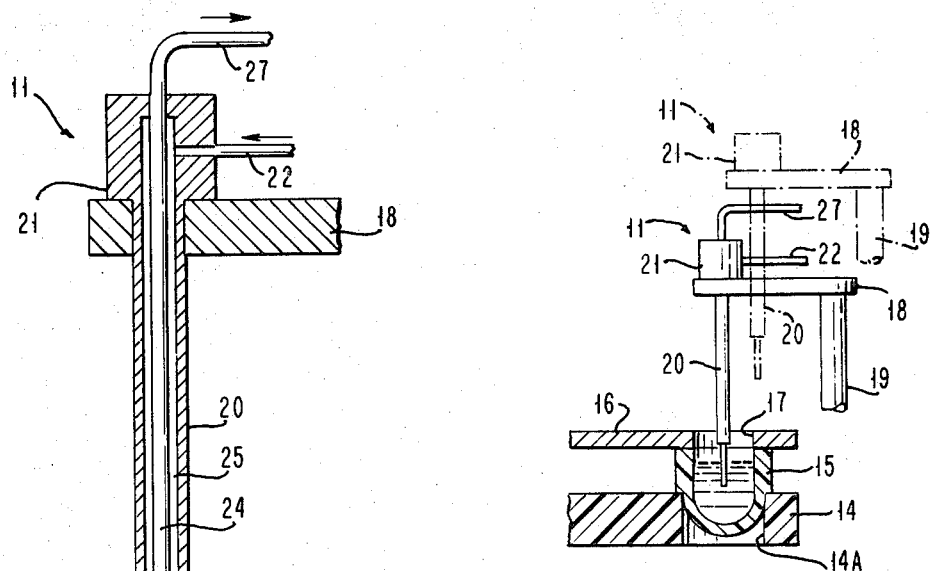
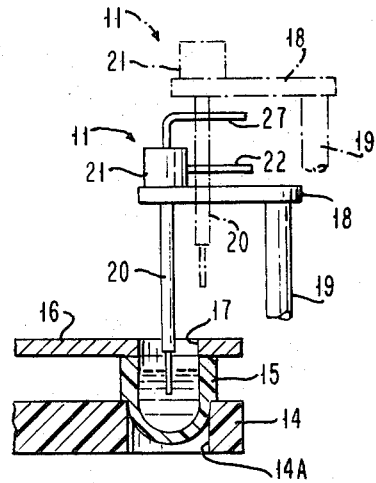

METHOD AND APPARATUS FOR SAMPLING

BACKGROUND OF THE INVENTION

1. Field of Invention

This invention relates to a method and apparatus for sampling liquids for automated continuous analysis and especially to a technique for achieving a particular flow of such liquid in a sample probe.

2. Prior Art

Apparatus for the continuous analysis of fluids are well known. Such an apparatus is disclosed in U.S. Pat. No. 2,797,149 issued June 25, 1957. U.S. Pat. No. 2,879,141 issued Mar. 24, 1959 discloses analysis apparatus of an automated type in which samples are fed in a flowing stream by means of an off-take device which aspirates liquid from each of a plurality of sample containers, which are sequentially presented thereto by a sampler assembly. Such apparatus is commonly employed for the analysis of various fluids.

In apparatus such as described, it is traditional to treat a specimen for analysis in a flame, for example, employing a spectrophotometer. Heretofore, attempts have been made to utilize such apparatus for quantitative analyses of trace amounts of what is known as "wear metals" in lubricating oil samples which have been taken from sources of used oil such as sumps of internal combustion engines or other types of engines for example, after a period of engine operation, to determine wear of lubricated metal engine parts by the presence in the oil of undue amounts of one or more kinds of metal. The presence of metal in very small amounts is usually normal and can be expected.

Such analyses are made for the purpose of determining whether or not an engine is in need of reconditioning or inspection of parts by disassembly. Cumulative amounts of wear metal in a series of lubricating oil samples taken from a single engine may be indicative of the amount of wear of an engine part or parts, especially when such tests are made repeatedly over a period of time of engine operation so as to give an engine history.

Metal of certain kinds found in such oil may indicate particular engine areas requiring at least inspection for wear. For example, iron in such oil may indicate wear of an iron camshaft, while the presence of chromium may indicate wear of chromium piston rings. The detection of unusually large amounts of aluminum in such oil indicates wear of parts constructed of such metal.

Known prior attempts at automated quantitative analyses of wear metals have been largely unsatisfactory because such tests gave imprecise results of measurements of metal present in such oil. The imprecision of such prior attempts at automated quantitative determinations was in the range of ±10 percent of the wear metal. This degree of inaccuracy of measurements made valid determinations as to whether or not an engine required an overhaul difficult at best.

As is well known, lubricating oil is used, as in engines, in varying viscosities. Oil samples from different engines may have quite different viscosities, and for this reason may flow at quite different rates in an analysis system wherein pressure is employed to induce flow in the system of liquid samples and reagents. More particularly, for a given aspiration time, more of a light oil would flow into an analysis system as from a sample cup through an off-take device than would a heavier or more viscous oil. This difference in flow of oil samples in such a system made for inaccurate test results.

SUMMARY OF THE INVENTION

It is an object of the invention to provide an improved method and apparatus for sampling of viscous liquids by aspiration of such liquid from a container through an off-take device insertable in the latter. A further object is to provide for the more uniform flow in automated analysis apparatus of unique samples of lubricating oil taken into the apparatus seriatum and which may have quite different viscosities prior to being caused to flow one after another in a stream in such apparatus, making possible more precise quantitative determinations of trace metals present in the samples.

A further object is to provide an improved probe structure in a sample off-take device for use in sampling viscous liquids which may be thinned by the addition of a solvent within the probe structure so as to flow more readily therein and in the remainder of the analysis apparatus, which addition is made after a very short distance of travel of the sample within the probe structure. It is an object of the invention to provide for the dilution of a liquid sample, such as lubricating oil, as by the addition thereto in a sample probe structure near the sample inlet of a reagent such as caprylic alcohol. This enables the use in an analysis system for determining wear metal in oil of a peristaltic proportioning pump for causing samples and reagents to flow in the system.

Still another object of the invention is to provide a probe structure including a outer tube vertically arranged and having at its upper end an inlet for reagent, and an inner sample tube axially arranged, of substantially smaller outer diameter than the internal diameter of the first-mentioned tube, extending through a bottom seal of the outer tube. The inner tube has a lower inlet end for sample and an upper outlet end without the outer tube. Within the confines of the outer tube, the inner tube is provided with communication between the interior thereof and the interior of the outer tube in a location in proximity to the bottom of the latter. Reagent is flowed into the outer tube inlet at a first predetermined flow rate and the admixture is aspirated through the outlet of the inner tube at a second predetermined flow rate which is faster, so that the sample is aspirated through the lower inlet end of the inner tube at a rate determined by the difference between the first and second flow rates.

BRIEF DESCRIPTION OF THE DRAWING

In the drawing:

FIG. 1 is a somewhat diagramatic view illustrating apparatus for sampling liquids, embodying the invention, and showing the same connected to a portion of an analysis system;

FIG. 2 is an enlarged fragmentary view in elevational section, illustrating the sample off-take device of the invention including a probe; and FIG. 3 is a fragmentary view, partially in elevational section, illustrating the use of the sample off-take device.

DESCRIPTION OF THE PREFERRED EMBODIMENTS

In FIG. 1 there is illustrated a sampler, indicated generally at 10, for supporting a plurality of liquid samples; a sample off-take device at 11 including a sample probe; a pump of 12 for aspirating sample and reagent, shown connected to the off-take device 11; and an ultrasonic mixer at 13 connected to the pump downstream from the latter, which mixer is located upstream of analysis elements not shown which may include a conventional flame device and a spectrophotometer.

The sampler includes (FIG. 3) the usual turntable 14 provided with a series of sockets circumferentially spaced from one another, one being indicated at 14A, to removably receive respective sample cups, one being indicated at 15. The respective sample cups 15 may contain different samples of lubricating oil containing trace amounts of wear metal, that is, samples from different sources, such as previously described, and of varying viscosities. The sampler includes a stationary coverplate 16 having an aperture 17 (FIG. 3) which registers with a sample cup indexed by the turntable 14 at an off-take station. Here sample is withdrawn from the indexed sample cup.

As shown in FIG. 3, the off-take device 11 is mounted for movement on one end of a horizontal arm 18 the other end of which is fixed to an end of a vertical shaft 19. The shaft 19 swings about a horizontal axis to raise and lower the off-take device, and the construction of the sampler and the mechanism for moving the off-take device 11 may be similar to that shown and described in Isreeli U.S. Pat. No. 3,251,229 issued May 17, 1966, so as not to require further description here. The off-take device 11 is lowered into and raised from an indexed sample cup 15. When it is in raised position, the off-take device aspirates air and, between samplings from neighboring cups, may be lowered into a stationary receptacle of wash liquid to aspirate a quantity of such liquid, all as described in the last-mentioned patent. If desired, the mechanism to move the off-take device into and out of the sample cup may be different in character and in accordance with Isreeli U.S. Pat. No. 3,038,340 issued June 12, 1962 or de Jong U.S. Pat. No. 3,134,263 issued May 26, 1964, by way of example.

It is to be understood from the foregoing that the off-take device is mounted for movement of the same into and out of the sample cups for the flow of the sample liquids from the receptacles automatically for treatment for analysis and analysis after such treatment. The turntable 14 of the sampler is operated intermittently to bring the sample cups in succession to the off-take station.

The off-take device comprises an outer tube 20 which is vertically arranged and which is structured of a corrosion resistant metal. This tube may be of cylindrical cross section. As shown in FIG. 2 the tube 20 passes through the distal end portion of the previously described support arm 18 and is suitably secured thereto so as to prevent axial dislocation of the tube. Above the arm, the tube 20 is provided with an enlarged upper end cap or seal 21 which is shown as abutting the upper surface of the support arm 18. The seal 21 may be integrally formed as part of the tube. In the region of the last-mentioned seal the tube 20 is provided with a fluid inlet, including a tube 22, which extends laterally into communication with the upper end portion of the interior of the tube 20. The lower end of the tube 20 has a cap or seal 23 which may be formed integrally therewith and through which an inner tube 24 extends.

The inner tube 24, which may be structured of a material similar to that of the outer tube, extends axially of the tube 20 beyond the aforementioned end seals thereof and is shown as having the portion thereof within the tube 20 concentrically arranged. The tube 24, which may be of cylindrical cross section, has an outer diameter substantially smaller than the inner diameter of the tube 20 to form a chamber 25 therebetween which extends between the end seals 21 and 23. The aforementioned end seals may support the tube 24 to prevent axial movement thereof with reference to the tube 20.

The illustration of the off-take device in FIG. 2 is many times larger than the actual device presently contemplated. By way of example the inner tube 24 may have an inner diameter of 0.034 inch and an outer diameter of 0.050 inch and the outer tube 20 may have an inner diameter of 0.79 inch and an outer diameter of 0.095 inch.

As shown the extension of the inner tube 24 in a downward direction beyond the end seal 23 is straight and vertically arranged, and the lower end 26 of the tube 24 is open to provide a sample inlet. Upwardly beyond the end seal 21, the tube 24 has an outlet end beyond a laterally directed portion 27 of the last-mentioned tube.

Within the confines of the outer tube 20 but spaced upwardly only a short distance from the lower end seal 23, the inner tube 24 is provided with a transverse opening 28 extending completely therethrough and in communication with the interior of the tube 24, forming diametrically opposite inlet ports which may be cylindrical. The last-mentioned ports are horizontally arranged and aligned. A similar opening 29, also within the confines of the outer tube 20, located intermediate the opening 28 and the end seal 23, is formed in the inner tube 24 to provide an additional pair of inlet ports on a lower horizontal plane but close to the opening 28. The openings 28 and 29 have their axes arranged in vertical planes which cross one another at right angles.

It is important in the use of the off-take device for sampling lubricating oil from sources of varying viscosities that the last-mentioned inlets in the tube 24 within the confines of the tube 20 be located in relatively close relationship to the sample inlet end 26 of the inner tube for reasons which will be apparent from the subsequent description of the operation of the off-take device for such sampling. By way of example the distance of the opening 29 in the tube 24 above the inlet end 26 of the last-mentioned tube may be approximately 0.40 inch.

During each rest period of the sampler turntable 14, the sample liquid is aspirated from the indexed sample receptacle at the off-take station by the pump 12 which, as shown in FIG. 1, includes resiliently compressible tubes 30, 32 connected respectively to fluid inlet tube 22 and fluid outlet 27 of the off-take device. Pump 12 may be of the construction shown in Smythe U.S. Pat. No. 3,306,229 issued Feb. 28, 1967. As shown diagramatically in FIG. 1, the pump comprises a plurality of compression rollers 34 in laterally spaced apart relation having their respective ends supported by a pair of parallel spaced-apart sprocket chains 36. The pump comprises a platen 38 against which a plurality of compressible tubes, including the tubes 30 and 32, are simultaneously compressed progressively along their lengths by the compression rollers 34 which are moved in an endless path longitudinally of the pump tubes by the sprocket chains 36.

While the pump is in operation, a reagent from a suitable source, not shown, is flowed in pump tube 30 to inlet 22 of the off-take device where it enters chamber 25 between the aforementioned tubes 20, 24, filling the chamber before the commencement of a sampling operation. The reagent flows into the off-take tube 24 through the ports 28, 29 for mixture with a sample in the last-mentioned tube when the latter is immersed in a liquid sample and the sample is drawn upwardly in the off-take tube 24. The multidirectional ports 28, 29 in the tube 24 make possible even dilution of the sample within the tube 24, and prevent surging of liquid within the last-mentioned tube. The dilution of the sample is continuous and made at a substantially constant rate. The sample is drawn upwardly in the tube 24 through the sample inlet end 26 of the tube, traveling only a short distance in the tube before the admixture therewith of the reagent. The mixture then passes upwardly in the tube 24 beyond the last-mentioned ports and through the outlet 27 of the off-take tube 24, flowing into pump tube 32. The sample is aspirated by the difference in the flow rates in the tubes 30, 32. For example, the flow through the tube 30 to the reagent inlet 22 may be 2.0 ml/min. while the flow through the tube 32 may be 2.5 ml/min., causing the sample to flow at the difference of 0.5 ml/min. and diluting the sample at a ratio of 4:1. For this purpose the pump tube 32 has a larger internal diameter than the pump tube 30.

Also during the operation of the pump, air or inert gas or other immiscible fluid may be caused to flow in pump tube 40 to join the sample-reagent mixture as at the junction 42. This use of an immiscible fluid segments the sample-reagent stream. This segmentation is for the purpose of maintaining sample integrity and cleansing of the tubing walls. The immiscible fluid may also segment portions of each liquid sample. The segmented sample-reagent stream is caused to flow from the pump 12 to the ultrasonic mixer 13 from which it flows for analysis. If desired, the diluted sample may be mixed by means other than the ultrasonic mixer 13. Instead, mixing may be accomplished utilizing one or more coils in which the diluted sample is transported toward analysis.

Mixture of a solvent with a sample of lubricating oil in the tube 24 near the sample inlet 26 reduces the viscosity of the oil in the off-take device to render samples of oils of different viscosities of a more uniform viscosity within the tube 24 and more uniformly flowable in the latter and through the pump on aspiration of the sample for proper proportioning by the pump 12. The short distance of travel of the undiluted lubricating oil in the off-take tube 24 prior to being mixed with a solvent does not significantly affect the flow rate of the sample. The reagent used for the above described purpose is advantageously caprylic alcohol.

Polyvinyl chloride has been employed as a material for pump tubing, and caprylic alcohol does not have such a corrosive affect on this tubing as other known solvents, which is one of the advantages of use of such alcohol as a diluent. Other solvents tried as diluents attacked all pump tubes tried for use on peristaltic type pumps. Such corrosive attacks rendered such pump tubes unusable. Hence, such pumps were not usable under these conditions. The combination of use of caprylic alcohol as a diluent with polyvinyl chloride pump tubing has worked well, and use of this diluent has also not interfered with the stability of a flame used in conjunction with a spectrophotometer. Other types of solvents have been observed to create unstable flames resulting in less satisfactory performance of analyses. It is to be understood that among the apparatus elements not shown may be a digital printer or a conventional recorder having operative connections from a spectrophotometer and having a driven stylus for cooperation with conventional chart paper to provide a record of the quantitative analysis of each of the samples in succession in the stream of sample liquids during the operation of the apparatus.

As previously indicated, the segmented sample-reagent stream on leaving the pump 12 may be introduced into the ultrasonic mixer 13 before continuing to flow to one or more stages for analysis. This mixer is capable of mixing the constituents of each liquid slug without disturbing the segmentation of the stream as by air bubbles. The mixer includes an upright walled container 44 which may be open at the top and serve as a receptacle receiving, among other things, a liquid up to a height similar to that shown in FIG. 1. The liquid may be water and the container 44 may have a water inlet 46 and a water outlet 48 so that water may be circulated through the container so as to maintain a relatively low temperature or inhibit an undue rise of water temperature in the operation of the mixer.

A suitably supported ultrasonic transducer, indicated generally at 50, is immersed in the liquid as shown, having an upwardly extending arm 52 in which an electrical lead 54 extends. A tubular coil 56 having one end thereof receiving the segmented sample-reagent stream downstream from the pump, as from the fitting 42, has the other end thereof connected to the one end of a tube 58 extending toward the analysis portion of the apparatus in the manner indicated in FIG. 1. The coil 56 may be completely immersed in the liquid in the container 44 but in the form shown it is only partially immersed therein. Ultrasonic mixing power from the transducer penetrates the wall structure of the coil to produce effective mixing, with the liquid in the container 44 acting as a coupling medium for this power while also serving as a cooling medium through circulation thereof.

When the off-take device 11 is raised, as from a sample cup, so that the inlet end 26 of the off-take tube 24 is suspended in the atmosphere, air is aspirated into the inlet end 26 of the tube 24, mixing with reagent flowing into the tube 24 from the tube 20 through the bores 28, 29. This mixture is aspirated into pump tube 32 from the tube 24. When the inlet end 26 of the off-take tube 24 is immersed in wash liquid in the manner previously described, the wash liquid flows into the aforementioned inlet of the tube 24, and as it is aspirated in the tube mixes with reagent flowing into the last-mentioned tube through the ports 28, 29. This flow of aforementioned mixed fluids between sampling intervals cleans the tubing walls with the aid of the immiscible fluid introduced into the fluid stream from the pump tube 40, and in this manner contamination of one sample by another is prevented.

It has been noted previously that each liquid sample is diluted near its point of entry into the conduit system of the analysis apparatus by the addition of a large proportion of diluent as by mixing one part of the sample to four parts of the diluent. This amount of dilution of lubricating oil samples of different viscosities renders the differences in sample viscosities relatively small so that substantially the same amount of sample may be taken off from every sample container in the same flow period.

In the use of the above described apparatus, precision of quantitative determinations of trace amounts of wear metal in lubricating oil has been greatly improved. With this improved method, determinations have been made which are precise within an average of ±0.5 percent of the wear metal present in oil. Precision within 0.27 to 1 percent of the amount of iron present in such oil has been developed using this technique. It will be appreciated that the method and apparatus may be useful in analyses of other liquids and substances.

It is believed the many advantages of this invention will now be apparent to those skilled in the art. The foregoing description is illustrative, rather than limiting, as a number of variations and modifications may be made without departing from the true spirit and scope of the invention. The invention is limited only by the scope of the following claims.

What is claimed is:

1. A method of treating a series of liquid samples for analysis, which samples have viscosities substantially greater than that of water and differing one from another, utilizing a sample probe immersible in such sample liquids successively and having a sample inlet and according to which the samples and a solvent liquid and a gas are transmitted in the form of a flowing stream in a first conduit connected to said probe and according to which said gas is effective to divide said stream into a series of spaced liquid segments separated from each other by intervening segments of gas, comprising: immersing said probe in such samples successively, flowing each such sample liquid into the probe while the latter is in the immersed condition through said inlet thereof, flowing said solvent liquid in a second conduit, flowing said gas in a third conduit, and concurrently introducing continuously said solvent liquid into the sample liquid in said probe in proximity to said inlet prior to the segmentation of said stream by said gas, so that the viscosity of the sample liquid is lessened for flow through said probe and said first conduit and the formation of said liquid segments occurs after the introduction of said solvent liquid, whereby the sample liquids flowing in said probe and in said first conduit tend to have uniform viscosities one to another.

2. A method as defined in claim 1, wherein: each sample liquid consists of lubricating oil.

3. A method as defined in claim 1, wherein: each sample liquid is lubricating oil bearing trace amounts of wear metal and the solvent liquid is caprylic alcohol.

* * * * *